Figure 1:
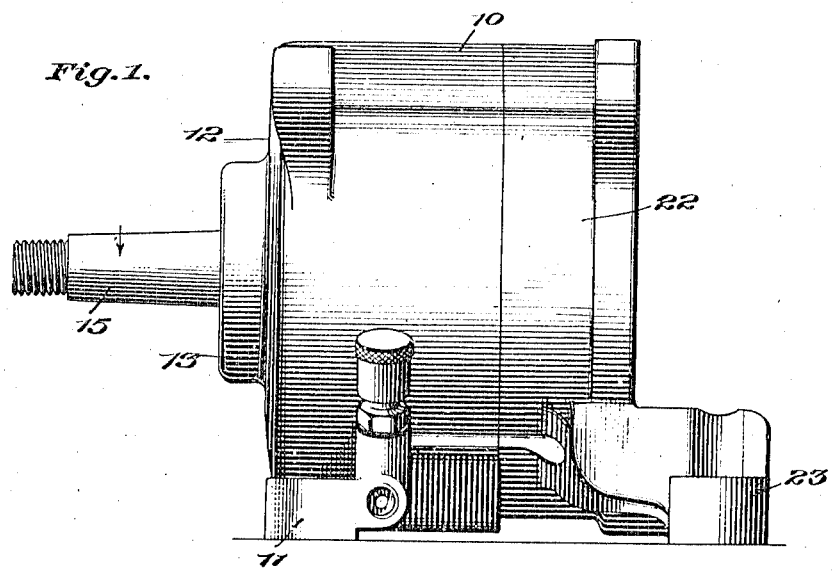

E. L. JONES & C. H. ROTH.
TRANSMISSION GEARING.
APPLICATION FILED JAN. 21, 1913.

1,082,028.

Patented Dec. 23, 1913.
4 SHEETS—SHEET 1.

Witnesses

Inventors
E. L. Jones and
C. H. Roth,
By C. L. Parker, Attorney

E. L. JONES & C. H. ROTH.
TRANSMISSION GEARING.
APPLICATION FILED JAN. 21, 1913.

1,082,028.

Patented Dec. 23, 1913.

4 SHEETS—SHEET 2.

Witnesses

Inventors
E. L. Jones and
C. H. Roth,
By C. L. Parker, Attorney

E. L. JONES & C. H. ROTH.
TRANSMISSION GEARING.
APPLICATION FILED JAN. 21, 1913.

1,082,028.

Patented Dec. 23, 1913.
4 SHEETS—SHEET 3.

Witnesses
G. C. Hennesy
B. W. Washburn

Inventors
E. L. Jones and
C. H. Roth,
By C. L. Parker, Attorney

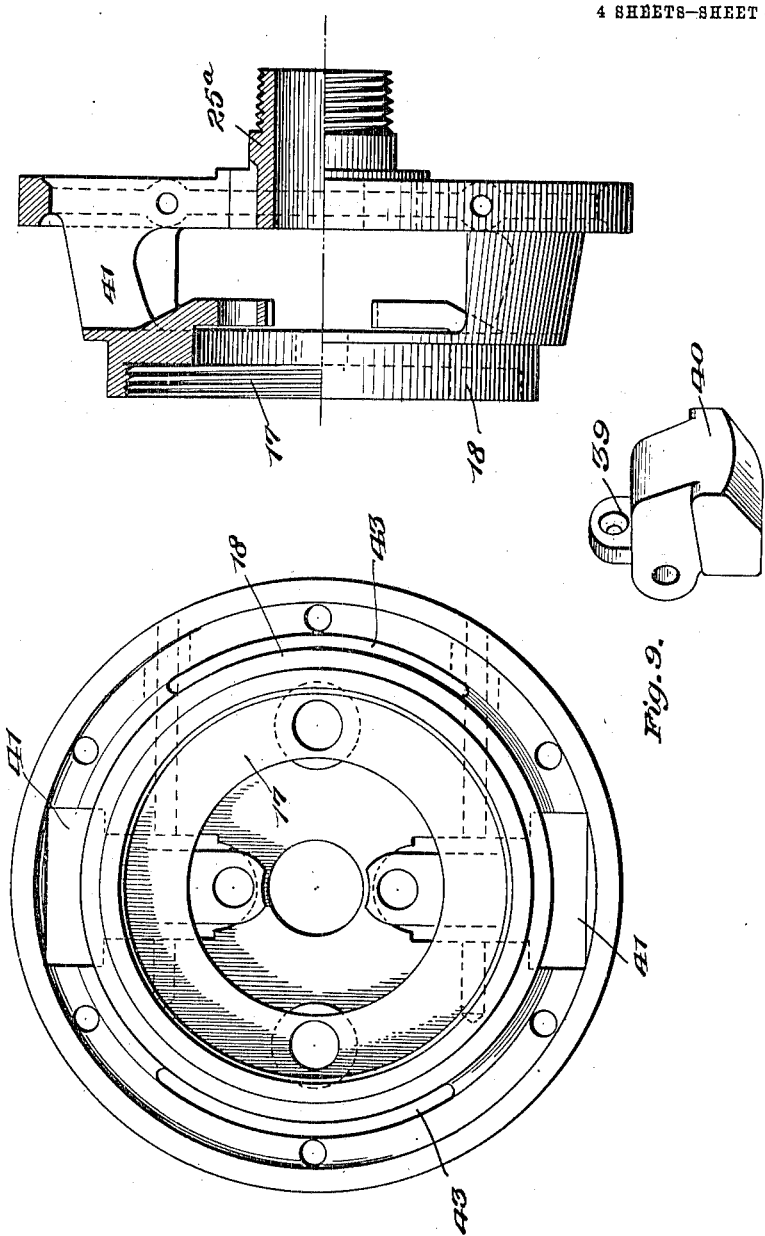

UNITED STATES PATENT OFFICE.

EDWARD L. JONES AND CHARLES H. ROTH, OF CHICAGO, ILLINOIS, ASSIGNORS TO JONES ELECTRIC STARTER COMPANY, OF CHICAGO, ILLINOIS, A CORPORATION OF ILLINOIS.

TRANSMISSION-GEARING.

1,082,028.     Specification of Letters Patent.     Patented Dec. 23, 1913.

Application filed January 21, 1913. Serial No. 743,376.

*To all whom it may concern:*

Be it known that we, EDWARD L. JONES and CHARLES H. ROTH, citizens of the United States, residing at Chicago, in the county of Cook and State of Illinois, have invented certain new and useful Improvements in Transmission-Gearing, of which the following is a specification.

This invention relates to transmission gearing and has particular reference to a novel form of such gearing adapted for use in or in connection with, self starters for internal combustion engines, notably those used in propelling automobiles.

For the purpose of illustration the invention will be shown and described in connection with an electrically operated self starter of the type comprising a motor-dynamo, transmission gearing between the motor-dynamo and the internal combustion engine to be started and a storage battery which is so arranged that it receives a charging current when the motor-dynamo is driven by the engine as a dynamo and serves to supply current to the motor-dynamo when the same is operating as a motor to start the engine. The transmission gearing of starters of this type is so constructed and arranged as to reduce the speed of rotation of the motor-dynamo, operating as a motor, in transmitting it to the engine to crank the same without effecting a corresponding increase in the speed of rotation of the engine in transmitting it to the motor-dynamo, operating as a dynamo, to charge the storage battery.

Transmission gearings of the character referred to, now in use, have been not wholly satisfactory, particularly on account of their weight, the amount of space they occupy and lack of durability and reliability.

It is the purpose of this invention to provide transmission gearing to connect two prime movers, such as an internal combustion engine and a motor-dynamo, so that each may, as required, drive the other at different relative rates of speed, such transmission gearing being compact, light in weight, strong, durable, reliable, inexpensive to manufacture, and automatic in operation.

Other objects and advantages of the invention will be apparent during the course of the following description.

Figure 2:
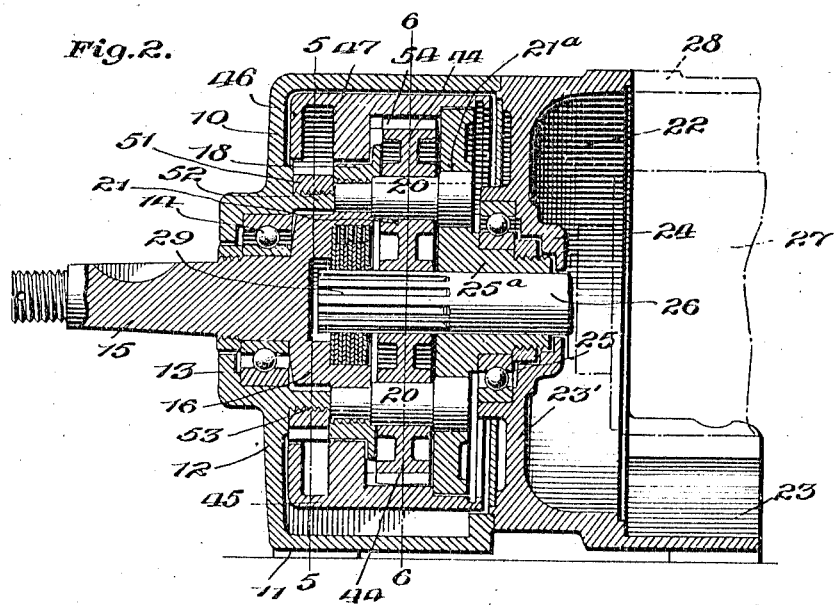
Figure 3:
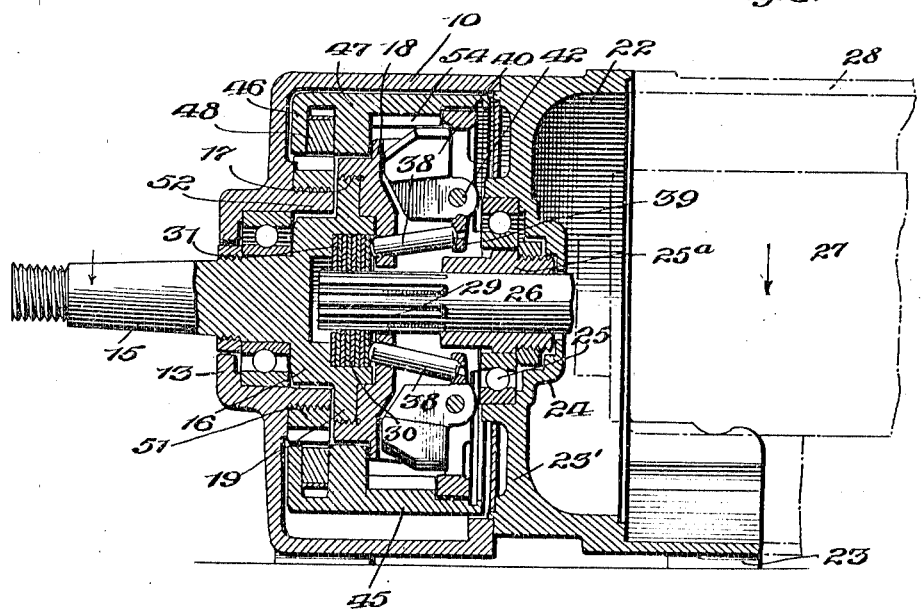
Figure 4:
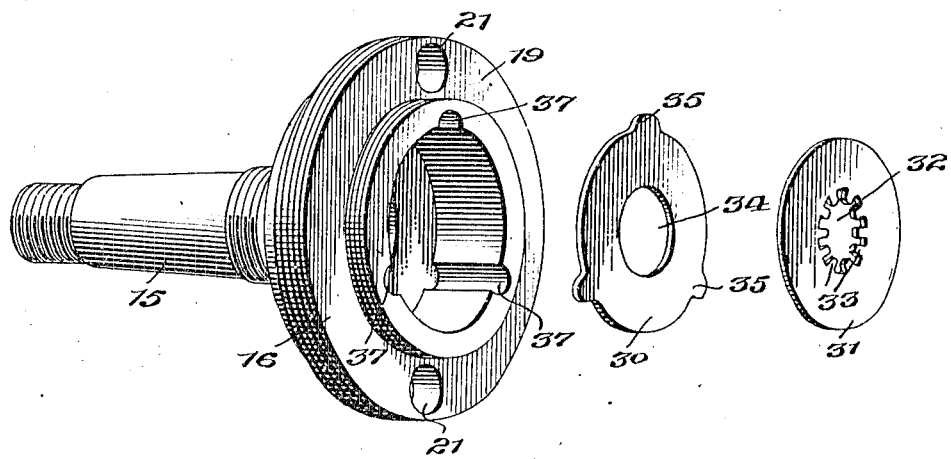
Figure 5:
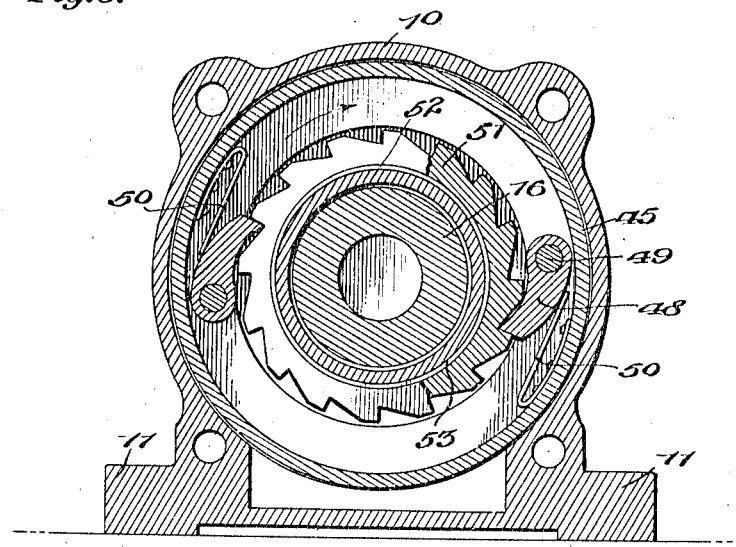
Figure 6:
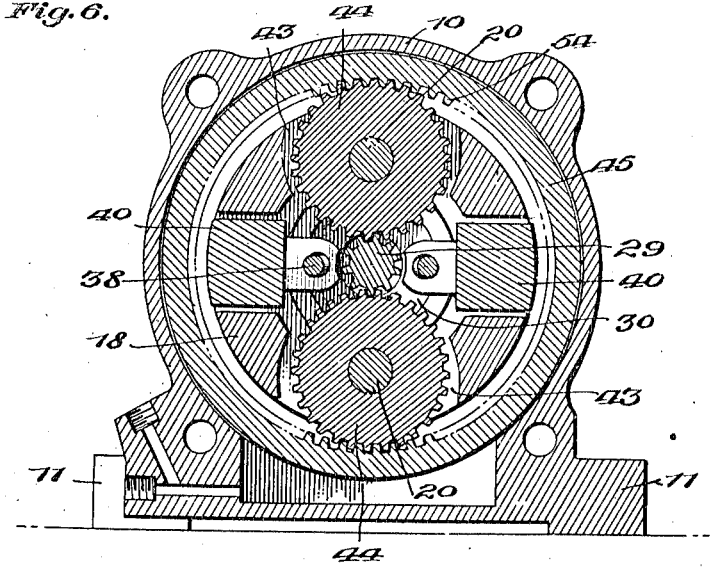

In the accompanying drawings forming a part of this specification and in which like numerals are employed to designate like parts throughout the same, Figure 1 is a side view of the device, Fig. 2 is a central longitudinal sectional view taken through the same, Fig. 3 is a similar view, the planetary gear carrier being shown disposed at a right angle to the position that it occupies in Fig. 2, Fig. 4 is a perspective view of a clutch mechanism, the different parts thereof being separated and shown in proper positions to be assembled. Fig. 5 is a transverse sectional view taken on line 5—5 of Fig. 2, Fig. 6 is a similar view taken on line 6—6 of Fig. 2, Fig. 7 is a side view, half in section, of the planetary gear carrier, Fig. 8 is an inner end view of the same, and Fig. 9 is a perspective view of one of the centrifugally operated elements which actuate the clutch mechanism.

In the drawings, wherein for the purpose of illustration, we have shown a preferred embodiment of our invention, the numeral 10 designates a forwardly disposed casing, preferably having its lower side flattened exteriorly and provided with laterally extending ears 11, whereby the casing may be securely attached to the frame of an automobile. The casing 10 is provided at its forward end 12 with an outwardly extending hollow boss 13, within which is mounted a ball-bearing structure 14, of any well known or preferred type.

The hollow boss 13 is provided with an opening for the passage of a shaft or stub-shaft 15, carrying the ball-bearing structure 14, as shown. The shaft 15 is suitably geared with a crank-shaft of the explosion engine. Rigidly connected with the inner end of the shaft 15 and preferably formed integral therewith is a cup-shaped shell 16, which fits within a correspondingly shaped recess 17 formed in one end of a rotatable planetary gear carrier 18. The cup-shaped shell 16 is provided with an outwardly extending annular flange 19, which preferably has screw-threaded engagement with the inner wall of the recess 17. The cup-shaped shell 16 is prevented from turning with relation to the planetary gear carrier 18 by means of stub-shafts 20, which pass through openings 21 and 21ᵃ and will be hereinafter referred to. It is thus seen that the cup-shaped shell 16 and shaft 15 are rigidly connected with the planetary gear carrier 18.

The numeral 22 designates an inner gear casing, which is preferably formed at its lower side flat exteriorly and is provided with laterally extending ears 23 whereby the same may be suitably connected with the frame of the automobile. This casing 22 has its forward end or head 23' provided with an inwardly extending hollow boss 24, for receiving a ball-bearing structure 25, which surrounds a hub or tube 25ᵃ formed integral with the planetary gear carrier and receiving an armature shaft 26. This armature shaft is preferably directly connected with an armature 27 included in a motor-dynamo of any well known or preferred type. This motor-dynamo is preferably mounted within a casing 28, disposed adjacent the casing 22. The armature shaft 26 is provided at its free end with gear teeth 29, as shown. Instead of forming these gear teeth upon the armature shaft 26 it is obvious that a pinion or gear could be rigidly connected with the armature shaft. The cup-shaped shell 16 is included in a friction clutch mechanism, the same serving to receive a plurality of sets of friction disks 30 and 31. The friction disks 31 are provided at their centers with main central openings 32 for the passage of the armature shaft 26 and inwardly extending teeth 33 to fit between the gear teeth 29. It is thus seen that the friction disks 31 are splined upon the end portion of the armature shaft. The friction disks 30 are provided with main central openings 34, through which the free end portion of the armature shaft 26 passes. The armature shaft is free to rotate within the openings 34 of the friction disks 30. The friction disks 30 are splined at their peripheries to the cup-shaped shell 16, and the same are provided with any suitable number of teeth 35, which fit within grooves or notches 37 formed through the cup-shaped shell 16, as shown. It is stated at this point that when the motor-dynamo 27 is operating as a motor to crank the engine, the armature shaft 26 is rotating faster than the shaft 15, whereby the two sets of friction disks 30 and 31 will slip. Although these two sets of friction disks are thus capable of slipping when the engine is being started or cranked, yet they have sufficient frictional engagement to transmit rotation from the shaft 15, to the armature shaft 26, with very little if any lost motion upon starting the motor-dynamo, when the same is being driven as a dynamo, and before it is placed under heavy or full load. When the engine speeds up so that the speed of the shaft 15 is increased there is an increase of the load upon the dynamo, with a correspondingly increased strain upon the friction clutch mechanism, whereby such friction clutch mechanism will tend to lose some of the motion transmitted through it from the shaft 15 to the armature shaft 26. To overcome this action, plungers or pins 38 are provided, which have their ends engaging with the friction plates, as shown. The outer ends of these plungers 38 are suitably connected with extensions or arms 39, carried by pivoted centrifugally operated elements or weights 40. These elements or weights are mounted within openings 41 formed in the planetary gear carrier 18 and are pivotally connected with such planetary gear carrier by pins 42, as shown. It is obvious that when the planetary gear carrier is rotated at an increased rate of speed, the elements or weights 40 will swing outwardly or toward the motor-dynamo 27, due to the action of centrifugal force, whereby the plungers or pins 38 will force the friction disks 30 and 31 into firmer frictional engagement, to practically lock the shafts 15 and 26 together.

The numeral 43 designates diametrically arranged openings disposed between the openings 41, as shown. Rotatably mounted within the openings 43 are planetary gears 44, carried by the stub-shafts 20. The planetary gears 44 extend outwardly beyond the periphery of the rotatable planetary gear carrier 18, as shown. As more clearly shown in Fig. 6, the planetary gears 44 permanently engage the gear or gear teeth 29, formed upon the armature shaft 26. Disposed between the rotatable planetary gear carrier 18 and the casing 10 is an annular control casing 45, provided at its forward end with an inwardly extending annular flange 46. Disposed inwardly of and spaced from the annular flange 46 is a ring 47, which may be rigidly connected with the control casing 45 by any suitable means. Mounted between the annular flange 46 and the ring 47 are a suitable number of inwardly swinging pawls 48, mounted upon pins 49, carried by the annular flange 46 and ring 47. The pawls 48 are urged inwardly by suitably stiff springs 50 (see Fig. 5). The pawls 48 engage a ratchet wheel 51, disposed inwardly of the same, as shown. This ratchet wheel is always stationary, the same being fixedly or rigidly connected with the end or head 12 of the casing 10. The end or head 12 has an inwardly extending annular flange 52, formed integral therewith, the same being screw-threaded to have screw-threaded engagement with the ratchet wheel 51, as shown at 53. It is to be understood that any suitable means may be employed to connect the ratchet wheel 51 with the casing 10 or to hold the same against rotation. Instead of employing the pawls and ratchet to prevent the rotation of the control casing 45, in one direction, any other suitable means may be used, such as a ball-clutch of any well known or preferred type. The control casing 45 is provided inwardly of the ring 47 with an internal annular gear 54, which is rigidly connected therewith. It is obvious that the control casing 45 is free to rotate in one direction but positively locked against rotation in a reverse direction by the pawls 48 and ratchet wheel 51. The planetary gears 44 permanently engage the internal gear 54, as clearly shown in Fig. 6.

The operation of the apparatus is as follows:—The armature shaft 26 and the shaft 15 are always rotated clockwise, as indicated by the arrows. The shaft 15 is either directly connected with the crank shaft of the engine or is suitably geared thereto so that it will rotate the crank shaft clockwise. When cranking or starting the engine, current is supplied to the motor-dynamo, which operates as a motor, the armature and armature shaft always rotating clockwise. The armature shaft rotates the gear or gear teeth 29, which causes the planetary gears 44 to rotate upon their axes and also travel around the internal annular gear 54 of the control casing 45. It is obvious that the pawls 48 and ratchet wheel 51 prevent the control casing 45 from rotating counter-clockwise or in the direction of the arrow, as shown in Fig. 5. The control casing 45 would be rotated counter-clockwise by the planetary gears 44, if the same were not held against rotation in that direction. The control casing 45 being held against rotation in a counter-clockwise direction, the internal annular gear 54 is also held against rotation in that direction. As the annular gear 54 cannot rotate the planetary gears 44 are rotated upon their axes, as above stated, and made to travel about the annular gear 54. It is thus seen that the planetary gear carrier 18 will be rotated clockwise at a reduced rate of speed with respect to the rate of speed of rotation of the armature shaft 26, as the gear 29 formed upon the armature shaft 26 is much smaller than the internal gear 54. The shaft 15 will accordingly be rotated clockwise at a reduced speed, which rotation is imparted to the crank shaft of the engine to rotate the same. As above stated, the two shafts 15 and 26 are rotated at different rates of speed. The clutch mechanism including the two sets of friction disks 30 and 31 also serve as direct connecting means between these two shafts. When the armature shaft 26 is rotating at a higher rate of speed than the shaft 15, the sets of friction disks 30 and 31 will slip, thus allowing the armature shaft 26 to rotate the shaft 15 through the medium of the planetary gears 44 and associated elements.

When the engine is running, it drives the motor-dynamo as a dynamo, so that the latter will generate current and supply the same to a storage battery, which current is of course used to operate the motor-dynamo as a motor. The crank shaft of the engine always rotates clockwise, whereby such rotation is imparted to the shaft 15. The clockwise rotation of the shaft 15 is imparted to the planetary gear carrier 18, and by the planetary gears 44, (which do not turn upon their axes) to the control casing 45. This control casing is free to rotate clockwise, as the pawls 48 will at first trip over the teeth of the ratchet wheel 51. When the engine speeds up, the pawls 48 are swung outwardly by centrifugal force and hence the same will not engage the teeth of the ratchet wheel 51, which does away with any noise which might be caused by the same engaging the ratchet wheel. The clutch mechanism including the sets of friction disks 30 and 31 will now serve as direct connecting means between the shaft 15 and the armature shaft 26, the sets of friction disks 30 and 31 not slipping as they have proper frictional engagement to do the work of rotating the armature shaft 26 when the engine is speeding up. As the speed of the engine increases, the centrifugal elements or weights 40 are swung outwardly, moving the pins or plungers 38 inwardly, to increase the frictional engagement between the two sets of friction disks 30 and 31, whereby the same will not slip as additional strain is applied to the clutch mechanism. It is thus seen that the armature shaft 26 will be rotated at the same rate of speed as the shaft 15.

It is to be understood that the form of the invention herewith shown and described is to be taken as a preferred example of the same, and that certain changes in the shape, size and arrangement of parts may be resorted to without departing from the spirit of the invention or the scope of the subjoined claims.

Having thus described our invention, we claim:—

1. In transmission gearing of the character described, a rotatable planetary gear carrier, planetary gears rotatably mounted thereon, a shaft provided with means to rotate the planetary gears upon their axes, a gear having permanent engagement with the planetary gears, means whereby said gear is free to rotate in one direction and positively prevented from rotating in a reverse direction, a second shaft connected with the rotatable planetary gear carrier, and clutch mechanism between the first and second named shafts.

2. In transmission gearing of the character described, a rotatable planetary gear carrier, planetary gears rotatably mounted thereon, a shaft provided with a gear to engage the planetary gears for rotating them upon their axes, a control gear engaging the planetary gears, means to positively prevent the rotation of the control gear in one direction, a second shaft connected with the planetary gear carrier, friction clutch mechanism between the first and second named shafts, and centrifugally operated means carried by the planetary gear carrier and adapted to operate the friction clutch mechanism.

3. In transmission gearing of the character described, a rotatable planetary gear carrier, planetary gears rotatably mounted therein and extending radially beyond the periphery of the same, a shaft to be connected with an armature and extending into the central portion of the planetary gear carrier, a gear connected with the shaft and engaging the inner sides of the planetary gears, a second shaft connected with the planetary gear carrier, friction clutch mechanism connecting the first and second named shafts, a control casing surrounding the planetary gear carrier, an internal annular gear rigidly connected with the control casing and engaged by the outer sides of the planetary gears, inwardly swinging pawls connected with the control casing, and a stationary ratchet wheel to be engaged by the pawls.

4. In transmission gearing of the character described, a stationary casing provided with an opening, a ratchet wheel rigidly connected with one end of the casing adjacent the opening, a rotatable planetary gear carrier mounted within the stationary casing, a shaft connected with the planetary gear carrier and extending through the opening, planetary gears mounted within the planetary gear carrier and extending radially beyond the periphery of the same, a second shaft, a gear disposed within the planetary gear carrier to engage the inner sides of the planetary gears and connected with the second shaft, a rotatable control casing disposed between the planetary gear carrier and the stationary casing, an internal annular gear carried by the control casing and engaging the outer sides of the planetary gears, pawls pivotally connected with the control casing and extending inwardly to engage the stationary ratchet wheel, friction clutch mechanism serving as additional connecting means between the first and second named shafts, and means to actuate the friction clutch mechanism including a suitable number of weights pivotally mounted within the planetary gear carrier.

5. In transmission gearing of the character described, a shaft, a cup-shaped shell connected therewith, a planetary gear carrier connected with the cup-shaped shell and provided with a central opening, a second shaft extending into the central opening and the opening of the cup-shaped shell, a plurality of alternate sets of friction disks mounted within the cup-shaped shell, one set being splined to the cup-shaped shell and the other set being splined to the second named shaft, a gear carried by the second named shaft near the friction disks, planetary gears connected with the planetary gear carrier and having their inner sides engaging said gear, an annular gear surrounding the planetary gear carrier and engaging the planetary gears, and pawl and ratchet mechanism to positively prevent the annular gear from rotating in one direction and allowing the same to rotate freely in the opposite direction.

6. In transmission gearing of the character described, a plurality of shafts, friction clutch mechanism forming connecting means between the same, centrifugally operated means to actuate the clutch mechanism, and speed reducing gearing between the shafts including planetary gears.

7. In transmission gearing of the character described, a rotatable planetary gear carrier, a planetary gear connected with the planetary gear carrier to rotate therewith and upon its axis with relation thereto, means whereby upon the rotation of the planetary gear carrier in one direction the planetary gear will be rotated upon its axis and upon the rotation of the planetary gear carrier in the opposite direction the planetary gear will rotate therewith without turning upon its axis, a shaft provided with means for rotating the planetary gear upon its axis, a second shaft connected with the planetary gear carrier, and separate connecting means between the first and second named shafts.

8. In transmission gearing of the character described, a stationary casing having one end closed by a head provided with a hollow boss, a rotatable planetary gear carrier having a tubular hub formed upon one end thereof, a shaft connected with the opposite end of the planetary gear carrier and extending through the hollow boss, a ball-bearing structure surrounding a portion of the shaft and fitting within the hollow boss to be held thereby, a second ball-bearing structure mounted upon the tubular hub, a head to close the opposite end of the stationary casing and provided with a hollow boss to receive and properly hold the second named ball-bearing structure, planetary gears connected with the planetary gear carrier, a shaft extending into the tubular hub and provided with gear teeth which engage the planetary gears, clutch mechanism between the first and second named shafts, an annular gear engaging the planetary gears, and means to prevent the rotation of the annular gear in one direction.

9. In transmission gearing of the character described, the combination with a plurality of shafts arranged in coöperative relation, of clutch mechanism adapted to connect the shafts, a rotatable planetary gear carrier disposed near the shafts, speed reducing gearing between the shafts including planetary gears connected with the planetary gear carrier, centrifugally operated means carried by the planetary gear carrier and adapted to operate the clutch mechanism whereby the same will positively lock the shafts together, and means connecting one shaft with the planetary gear carrier.

10. In transmission gearing of the character described, the combination with a plurality of shafts arranged in end to end relation, of a multiple disk clutch mechanism connecting the adjacent ends of the shafts, a rotatable planetary gear carrier surrounding the multiple disk clutch mechanism, speed reducing gearing between the shafts including planetary gears mounted upon the planetary gear carrier, centrifugally operated means mounted upon the planetary gear carrier and adapted to operate the multiple disk clutch mechanism whereby the same will lock the shafts together, and means connecting one shaft with the planetary gear carrier.

11. In transmission gearing of the character described, the combination with a plurality of shafts arranged in coöperative relation, a planetary gear carrier disposed near the shafts and connected with one of them, connecting means between the shafts, centrifugally operated means mounted upon the planetary gear carrier and adapted to operate the connecting means, and speed reducing gearing between the shafts including planetary gears mounted upon the planetary gear carrier.

12. In transmission gearing of the character described, the combination with a plurality of shafts arranged in end to end relation, of a housing connected with one shaft for rotation therewith, clutch mechanism disposed between the shafts for connecting them, centrifugally operated means mounted upon the housing and adapted to operate the clutch mechanism whereby the same will lock the shafts together, and speed reducing gearing connecting the shafts.

13. In transmission gearing of the character described, the combination with a rotatable planetary gear carrier, of planetary gears rotatably mounted thereon, a shaft, means connected with the shaft and engaging the planetary gears, a gear having permanent engagement with the planetary gears, means whereby said gear is free to rotate in one direction and positively prevented from rotating in an opposite direction, a second shaft connected with the rotatable planetary gear carrier, and independent connecting means between the first and second named shafts.

14. In transmission gearing of the character described, the combination with a rotatable planetary gear carrier, of planetary gears rotatably mounted thereon, a shaft, means carried by said shaft and meshing with the planetary gears, an annular gear surrounding the planetary gears and permanently engaging the same, a relatively stationary element, clutch means between the annular gear and the relatively stationary element, and a second shaft connected with the planetary gear carrier, and clutch means between the first and second named shafts.

In testimony whereof we affix our signatures in presence of two witnesses.

EDWARD L. JONES.
CHARLES H. ROTH.

Witnesses:
HIRAM WALKER,
HARRY HOLDSWORTH.